No. 646,758. Patented Apr. 3, 1900.
W. N. PARKES.
BUTTONHOLE SEWING MACHINE.
(Application filed Nov. 2, 1896.)
(No Model.) 9 Sheets—Sheet 2.

WITNESSES: INVENTOR:
William N. Parkes,
BY
ATTORNEY

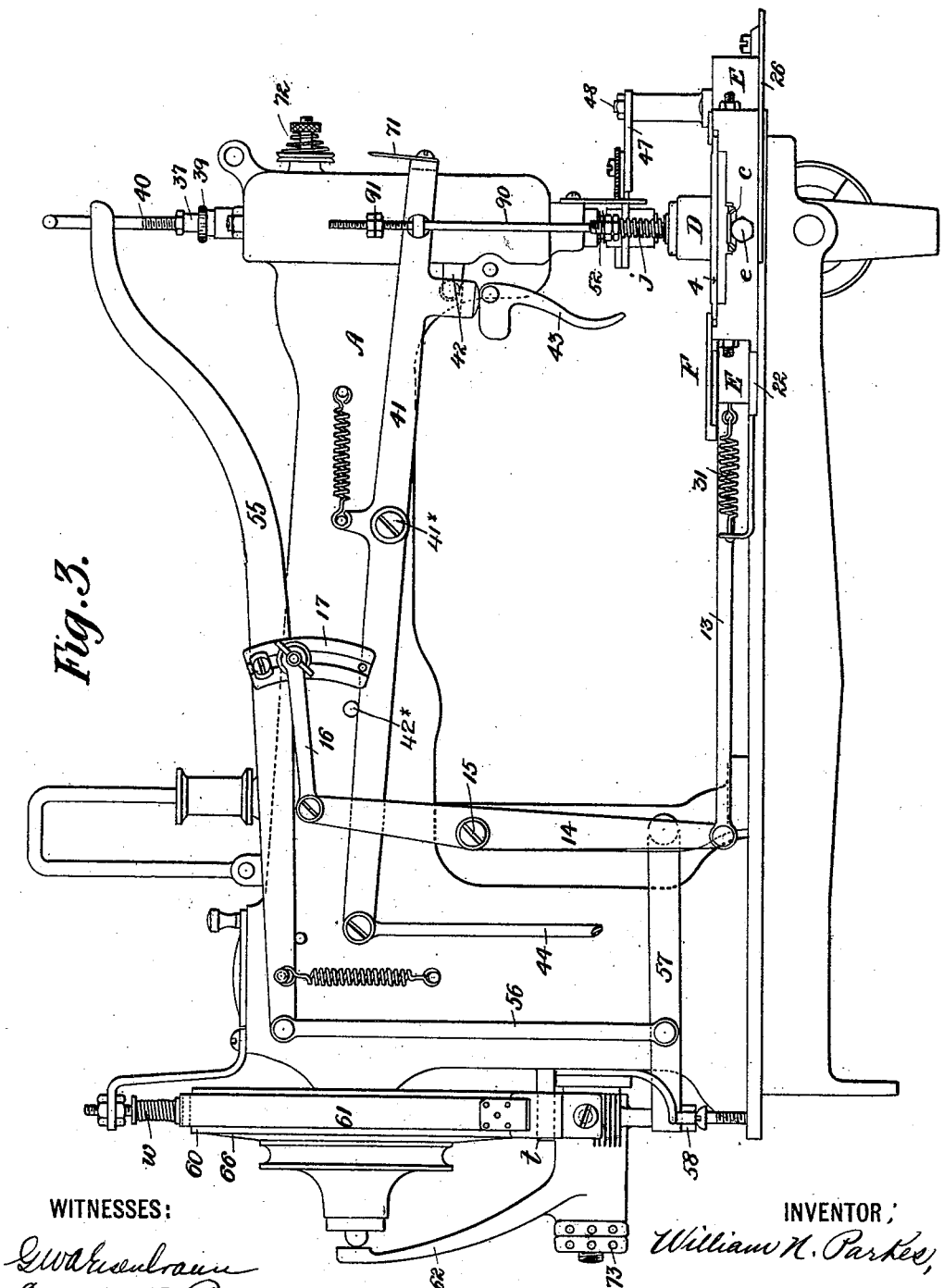

No. 646,758. Patented Apr. 3, 1900.
W. N. PARKES.
BUTTONHOLE SEWING MACHINE.
(Application filed Nov. 2, 1896.)
(No Model.) 9 Sheets—Sheet 4.
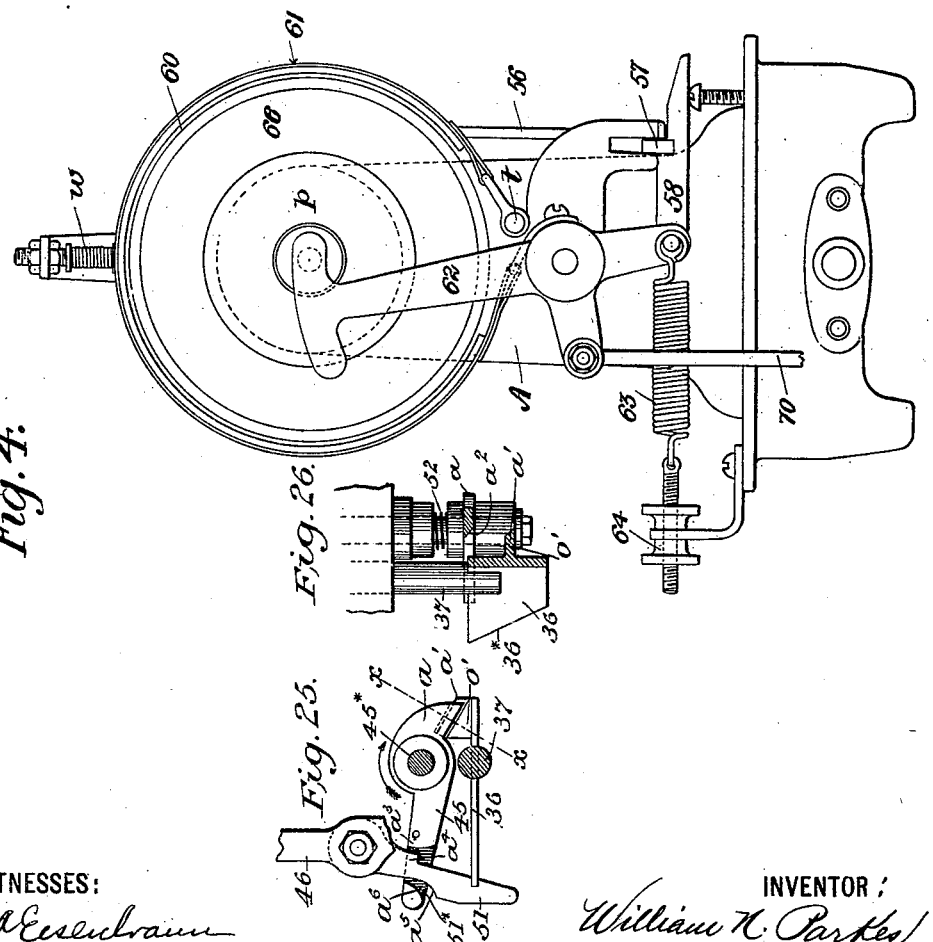

No. 646,758. Patented Apr. 3, 1900.
W. N. PARKES.
BUTTONHOLE SEWING MACHINE.
(Application filed Nov. 2, 1896.)
(No Model.) 9 Sheets—Sheet 5.
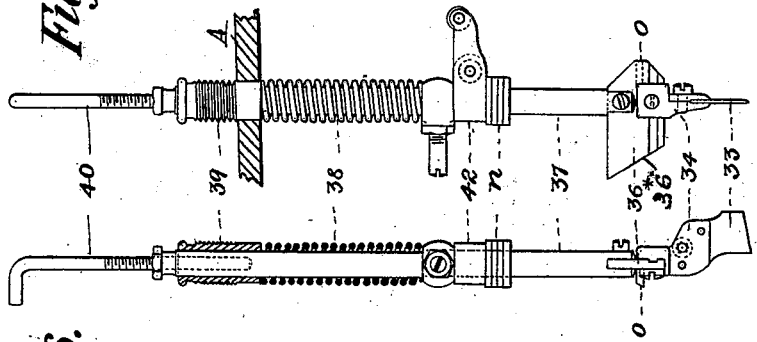
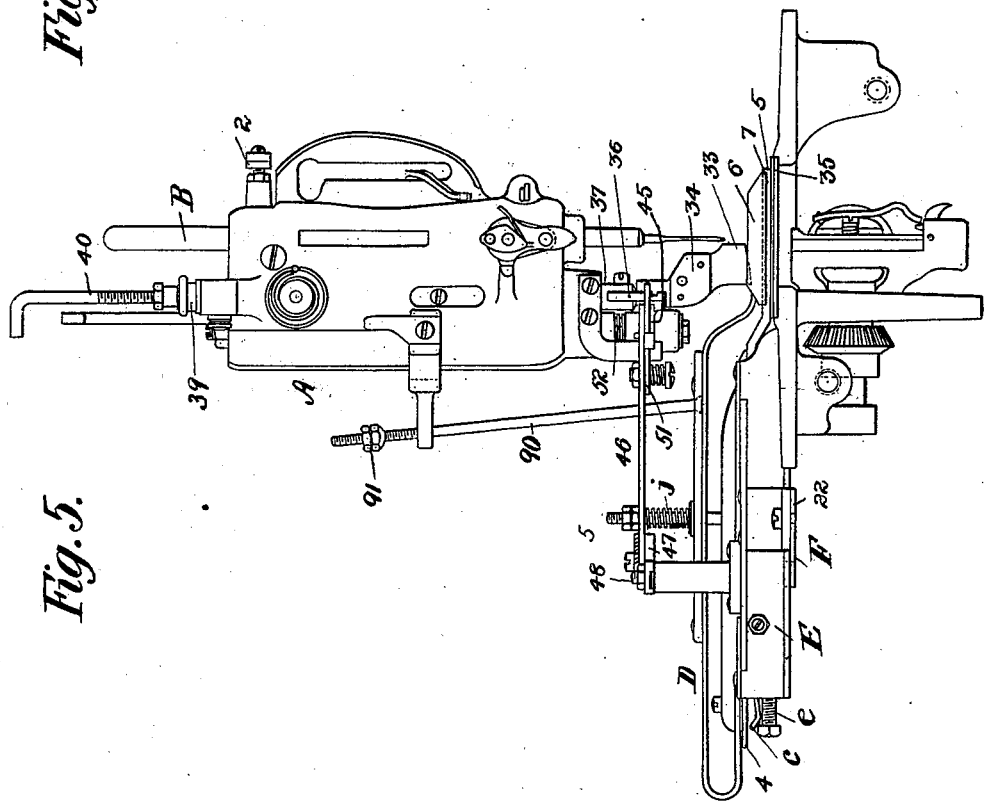
WITNESSES:
G. W. A. Eisenbraun
Eugenie A. Presides
INVENTOR,
William N. Parkes
BY
A. Aberdulhur
ATTORNEY No. 646,758. Patented Apr. 3, 1900.
W. N. PARKES.
BUTTONHOLE SEWING MACHINE.
(Application filed Nov. 2, 1896.)
(No Model.) 9 Sheets—Sheet 6.
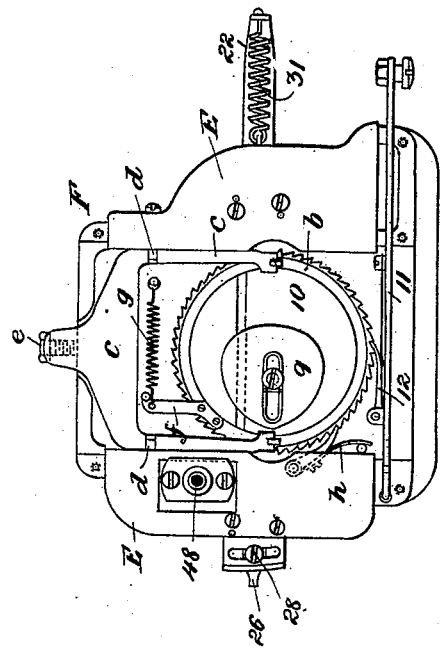
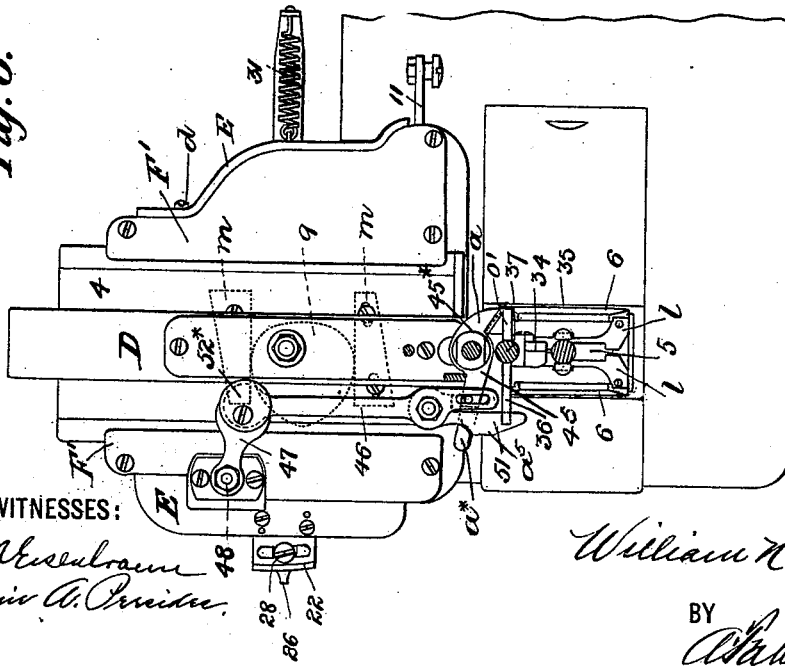
WITNESSES:
INVENTOR
William N. Parkes
BY
ATTORNEY No. 646,758. Patented Apr. 3, 1900.
W. N. PARKES.
BUTTONHOLE SEWING MACHINE.
(Application filed Nov. 2, 1896.)
(No Model.) 9 Sheets—Sheet 7.
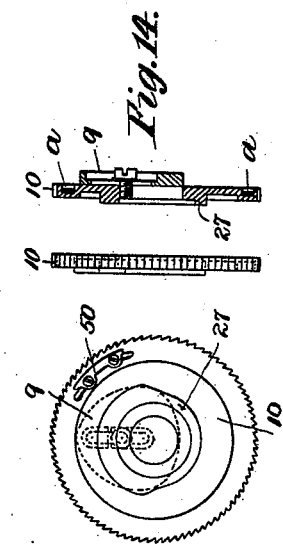
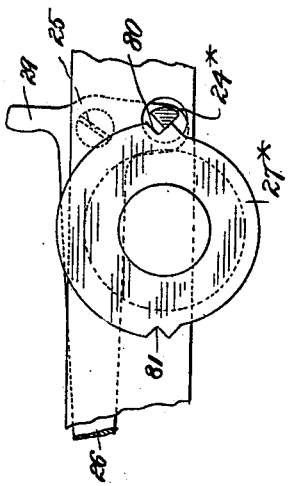
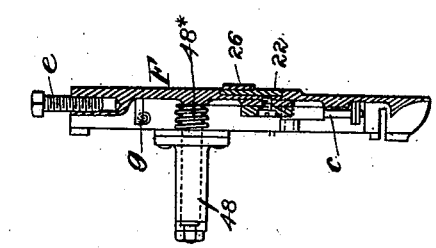
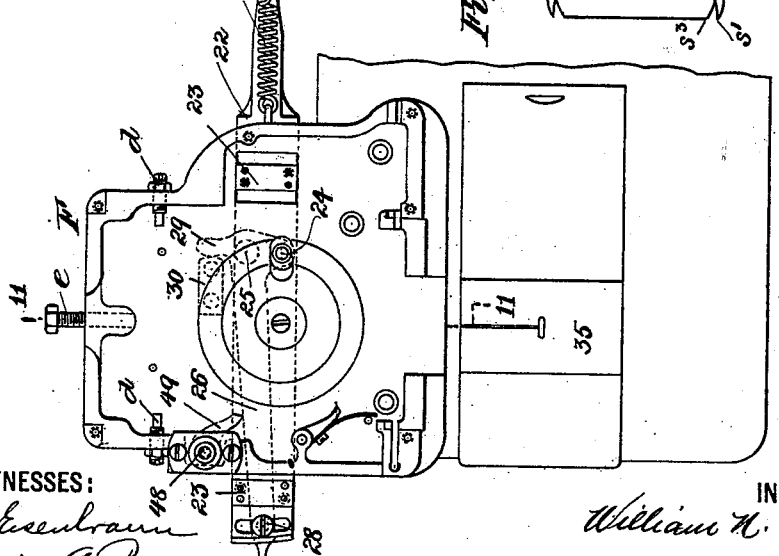
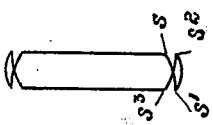
WITNESSES:
INVENTOR,
William N. Parkes
BY
ATTORNEY No. 646,758. Patented Apr. 3, 1900.
W. N. PARKES.
BUTTONHOLE SEWING MACHINE.
(Application filed Nov. 2, 1896.)
(No Model.) 9 Sheets—Sheet 8.

WITNESSES:
INVENTOR:
William N. Parkes,
BY
ATTORNEY

No. 646,758. Patented Apr. 3, 1900.
W. N. PARKES.
BUTTONHOLE SEWING MACHINE.
(Application filed Nov. 2, 1898.)
(No Model.)
9 Sheets—Sheet 9.
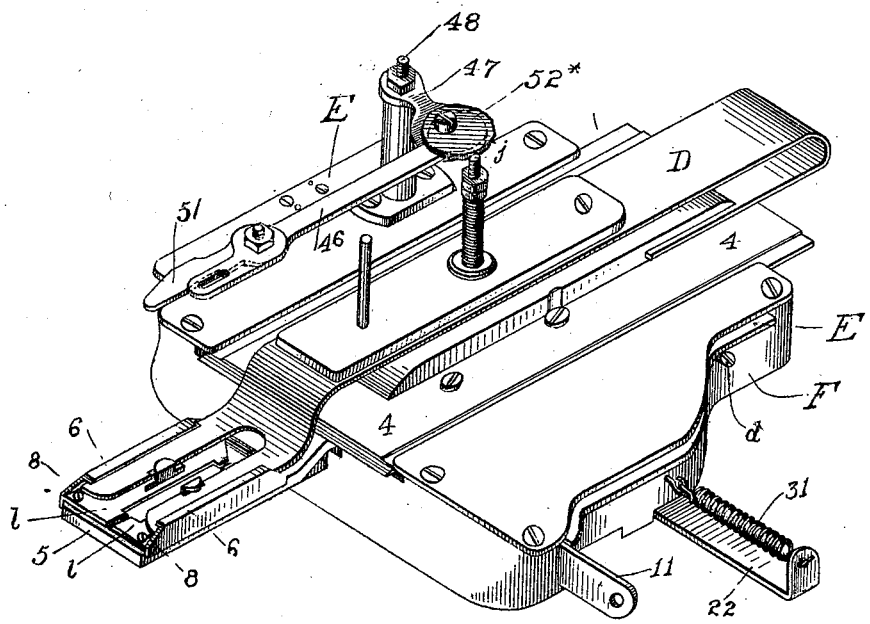
Fig. 22.
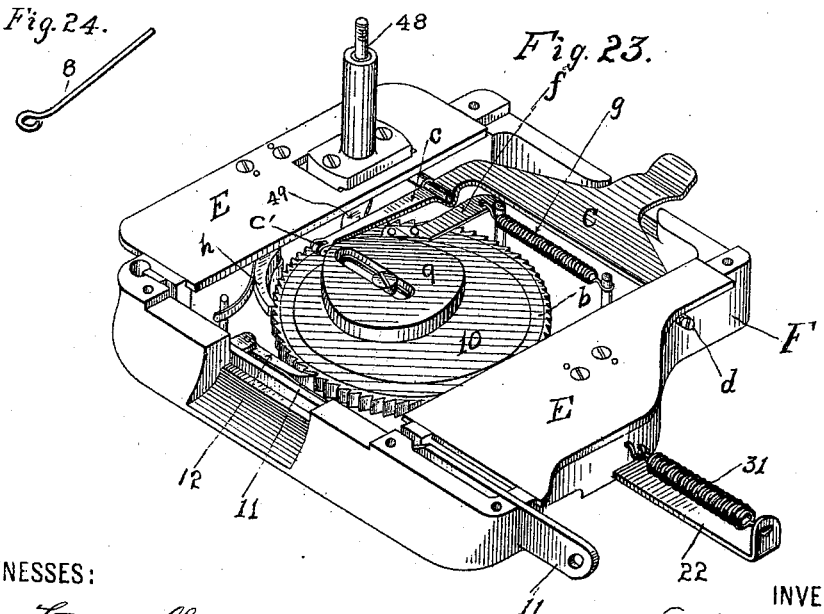
Fig. 24.
Fig. 23.
WITNESSES:
INVENTOR:
William N. Parkes,
BY
ATTORNEY

UNITED STATES PATENT OFFICE.

WILLIAM N. PARKES, OF NEW YORK, N. Y.

BUTTONHOLE-SEWING MACHINE.

SPECIFICATION forming part of Letters Patent No. 646,758, dated April 3, 1900.

Application filed November 2, 1896. Serial No. 610,810. (No model.)

*To all whom it may concern:*

Be it known that I, WILLIAM N. PARKES, a citizen of the United States of America, and a resident of New York, (Brooklyn,) in the county of Kings and State of New York, have invented certain new and useful Improvements in Sewing-Machines, of which the following is a specification.

My invention has reference to improvements in sewing-machines, and particularly to buttonhole-sewing machines.

It consists, mainly, in a vertically-reciprocating and laterally-vibrating needle and novel and improved means in connection therewith for feeding the work, so as to stitch straight buttonholes and securely tack or bar the ends thereof. It has, among other things, certain novel and improved means in combination with the feeding and stitching mechanism, for automatically cutting the buttonhole and arresting the movement of the machine.

The nature of my invention will best be understood when described in connection with the accompanying drawings, in which—

Figure 1:
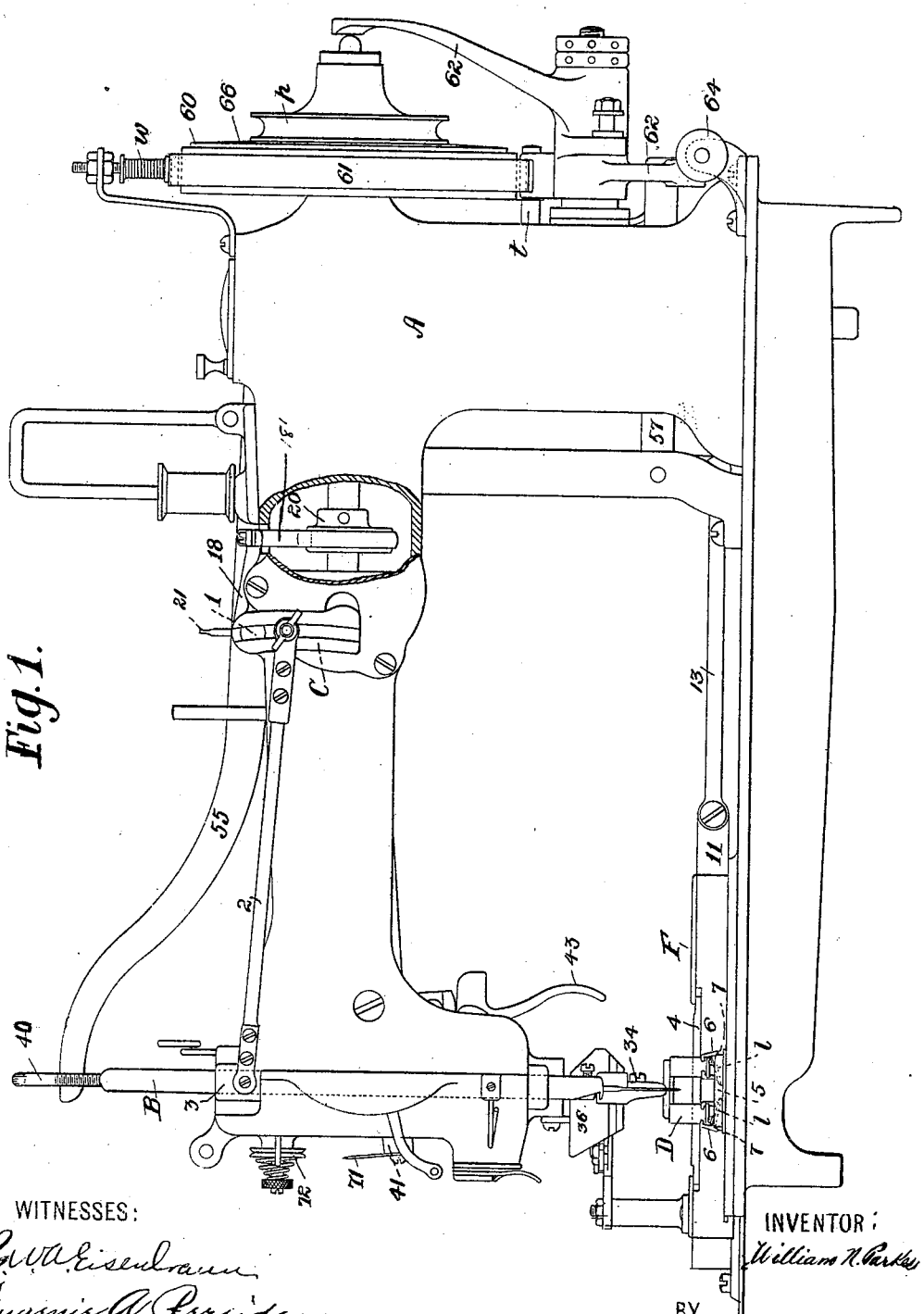
Figure 2:
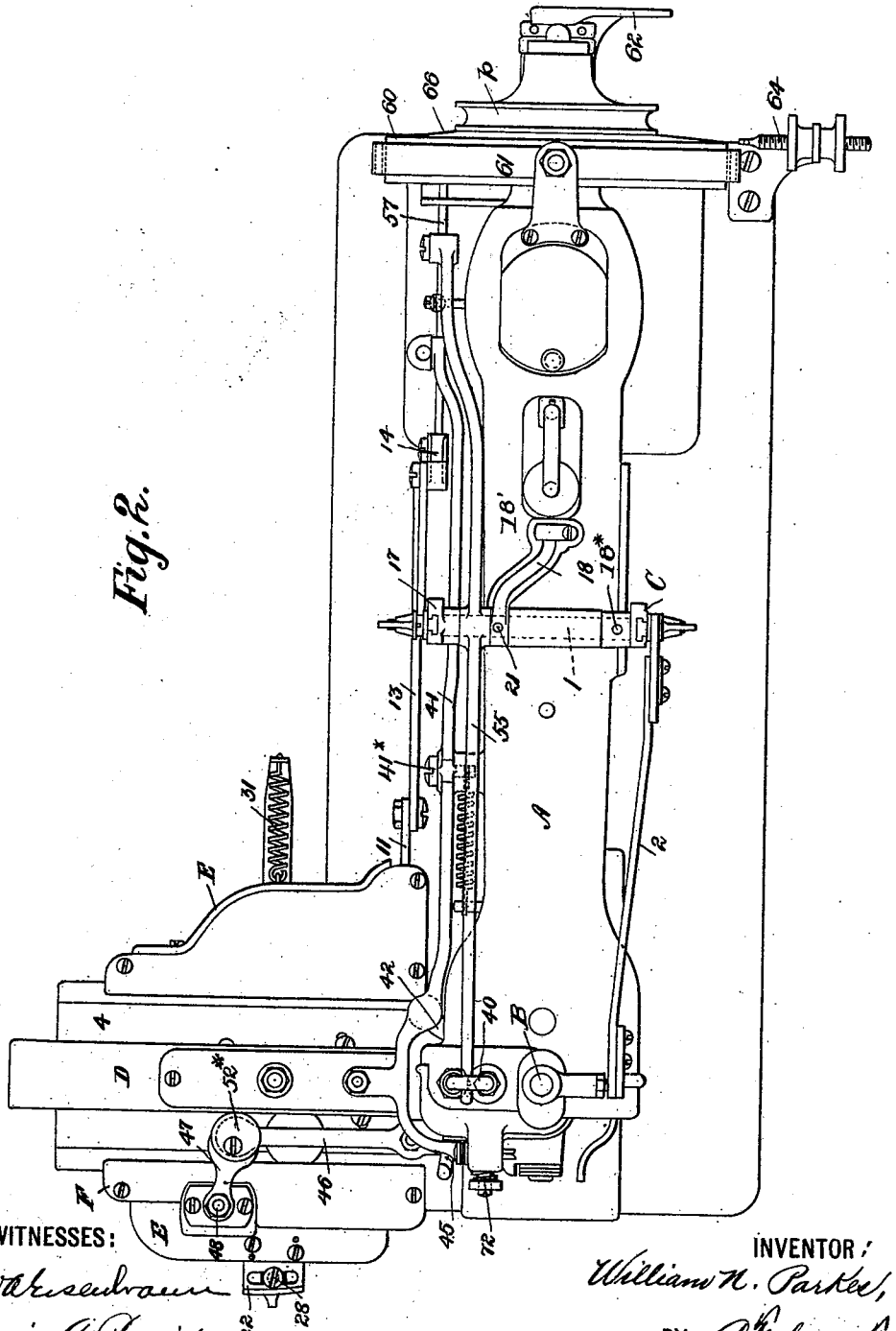
Figure 20:
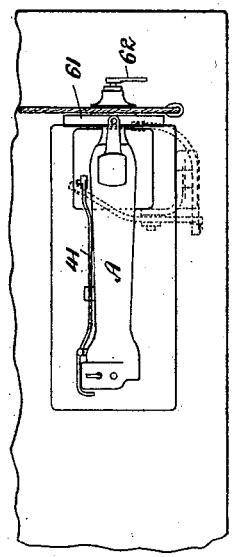
Figure 18:
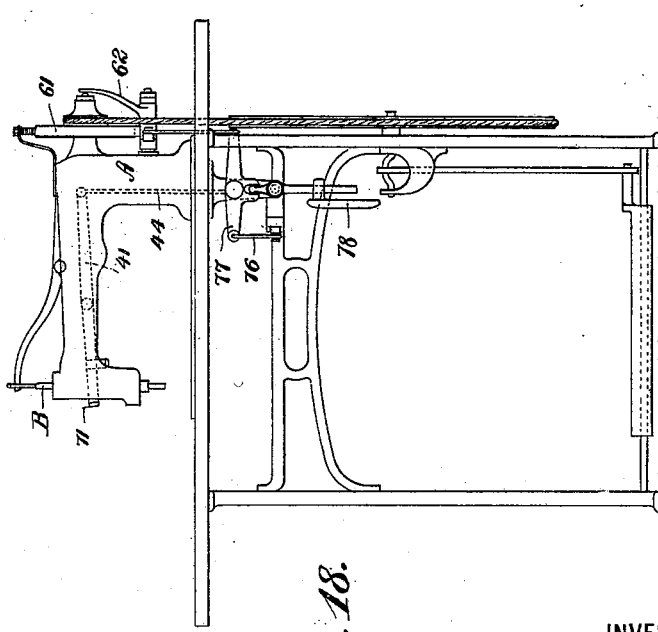
Figure 19:
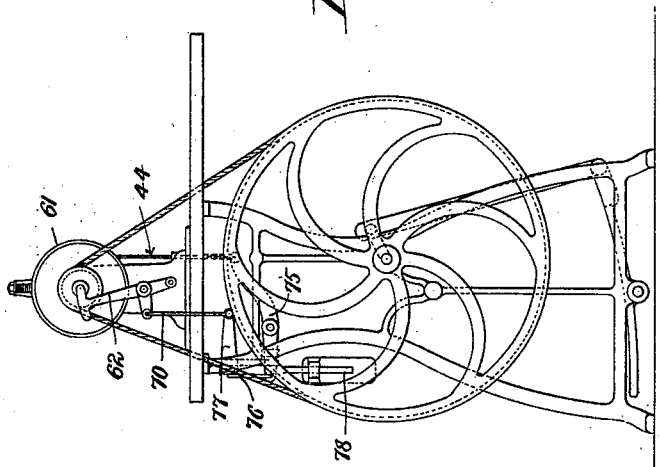

Figure 1 represents a front elevation of the head of a sewing-machine embodying my invention. Fig. 2 is a plan or top view of the same. Fig. 3 is a rear elevation of the head. Fig. 4 is an end elevation of the head. Fig. 5 is an end elevation of the opposite end or face of the machine. Figs. 6 and 7 are detail elevations of the cutter-bar and parts thereto appertaining. Fig. 8 is a sectional plan view of the buttonhole work-carrier mechanism. Fig. 9 is a plan view of the same with the upper slide and its guides removed. Fig. 10 is a plan view of the lower portion of the work-carrier operating mechanism. Fig. 11 is a section on the line 11 11, Fig. 10. Figs. 12, 13, and 14 are detail views of the feed-wheel and cams for operating the buttonhole work-carrier. Fig. 15 is a detail illustrating a modified form for the lower slide-actuating cams. Fig. 16 is a top view of the cloth-plate. Fig. 16* is a cross-section of the same. Fig. 17 is an end view, on an enlarged scale, illustrating the construction of the presser-shoes. Fig. 17* is a plan or top view of Fig. 17. Fig. 18 is a front elevation, on a smaller scale, showing the machine and stand complete. Fig. 19 is an end view of the same. Fig. 20 is a plan or top view with part broken away. Fig. 21 is a diagram of a buttonhole. Fig. 22 is a perspective view of the actuating mechanism of the work-feed. Fig. 23 is a similar view of the actuating mechanism of the work-feed with part removed. Fig. 24 is a perspective detail of one of the springs used in connection with the presser-foot. Fig. 25 is a top view showing the position of the trip-dog 51 and the support 45 when the cutter is in its depressed position after being actuated. Fig. 26 is a vertical section on the line $x\,x$, Fig. 25.

Similar letters and numerals of reference designate corresponding parts throughout the several views of the drawings.

Referring at present to Figs. 1, 2, and 3 of the drawings, the letter A designates the head of a sewing-machine, and B is the needle bar or carrier, to which reciprocating and vibratory motions are imparted in any usual manner. In the present instance I have shown an ordinary form of zigzag mechanism in which the needle bar or carrier is laterally vibrated from a segment C, which is fulcrumed at its upper end on a shaft 1 in a manner adapting it to be oscillated loosely on the said shaft or to be rigidly attached thereto, which presently will be further explained. The lower end of the segment C is in engagement with a usual switch-cam (used in Wheeler & Wilson zigzag and buttonhole machines) through a usual switch-cam follower. The segment C is connected by a link 2 with the needle-bar gate or frame 3. The box F, in which the work-carrier mechanism is arranged, is located directly back of the needle, in which particular my machine is distinguished from those machines in which said mechanism is located to one side of the needle-bar and below the arm of the machine. The clamp D of the work-carrier, Figs. 5, 8, and 22, I have shown in the present instance formed of an upper member or jaw made of flat spring-steel and attached to a slide 4, guided to move toward and from the needle—that is, transversely to the plane of vibration of the same—and of a second or lower member secured to the same slide and terminating in a cloth-plate 5. Said clamp is normally closed, and the pressure may be varied by a spring and stud $j$. The end of the upper member or jaw is slotted or bifurcated above the cloth-plate to permit the passage of the needle and of the cutter-blade. The cloth-plate 5 is likewise slotted and is provided with faces beveled toward the slot, as shown in Figs. 16 and 16*, while its upper longitudinal edges are suitably milled or toothed. To the upper member or jaw of the clamp are attached two presser-shoes 6, adapted to turn laterally. Said presser-shoes are constructed with outer side ledges 7, suitably milled or toothed and adapted to come into contact with the work directly outside of the longitudinal edges of the cloth-plate 5, and said presser-shoes are also provided with inner faces or plates $l$, overhanging the beveled faces of said cloth-plate. Springs 8, attached to the presser-shoes, press against the clamp, with a tendency to hold the presser-shoes in substantially-horizontal positions. When the cloth-clamp closes on the work, the milled outer ledges 7 first engage with the work and hold the same, whereupon the presser-shoes turn inwardly about said ledges as fulcra and stretch the work across the slot in the cloth-plate, said outer ledges firmly holding the work in view of the friction established by the milled contact-surfaces and the pressure of the clamp. A reciprocating motion is imparted to the work-carrier slide 4 by means of a cam 9, mounted on a ratchet or feed wheel 10 and engaging with jaws $m$, transversely placed on the bottom of said slide. The cam 9 is connected with the ratchet-wheel 10 by means of a slot and screw, so that by adjusting the same its throw can be varied, and consequently the length of the tack or buttonhole. An intermittent motion is imparted to the ratchet-wheel by the following means: In the box F is mounted a slide 11, carrying an actuating-pawl 12, which engages with the ratchet-wheel. The end of the slide projecting beyond the box is connected by a link 13 with a lever 14, pivoted at 15, Fig. 3, and having its opposite end connected by means of a link 16 with a block adjustably mounted in a segment 17, said segment being rigidly attached to the shaft 1. By adjusting the position of the block on the segment 17 the speed of the ratchet-wheel 10 can be varied. A sleeve formed on the upper end of the segment C extends inwardly on the shaft 1, as shown in Fig. 2, which serves as a bearing for the segment C, a hole 18*, extending through the sleeve in line with a hole in the shaft 1, (not shown,) serving, by means of any ordinary pin adapted to fit therein, as a means for locking the segment on the shaft 1. If the segment C is rigidly attached to said shaft 1, it will under the action of the usual switch-cam which I use, as before mentioned, feed the ratchet-wheel, and consequently the work-carrier, at each alternate stitch.

Assuming now that the segment C is rigidly locked on the shaft 1 by means of a pin being placed in the hole running through the sleeve of the same and into a hole in the shaft 1, as before mentioned, the shaft 1 will receive an oscillating movement through the action of the switch-cam, which movement will be communicated to the segment 17 and through it and its connections to the pawl 12, and thereby actuate the ratchet-wheel 10, and through it the work-clamp, once to every other stitch of the machine—that is, once to two reciprocations of the needle. It is thought that it is better to move the work-clamp longitudinally for each reciprocation of the needle. Therefore the following means are provided for this purpose: An eccentric 20 is mounted on the main shaft of the machine. A strap 18' at its lower end encircles the eccentric 20 and at its upper end connects with the extending end of an arm 18, which arm is at its other end mounted on the shaft 1, a removable pin 21, passing through the arm into the shaft, serving as a means for locking the said arm on the said shaft, Figs. 1 and 2. Assuming now that the segment C is disconnected from the shaft 1—that is, there being no pin connection between the same and the said shaft 1—the said segment C will simply oscillate through the action of the usual switch-cam, the said shaft 1 serving as a fulcrum or pivot for the segment. The connection between the shaft and the segment under these circumstances being a loose one, their movements will not affect each other. Assuming now that the removable pin 21 rigidly connects the arm 18 with the shaft 1, it is of course seen that the shaft 1 will get an oscillatory movement each time the main shaft turns from the action of the eccentric 20 and its connection with the aforesaid shaft 1 and that this movement is transmitted to the work-carrier through the intermediate mechanism.

The longitudinal reciprocation of the work-clamp in a direction substantially at right angles to the plane of vibration of the needle will serve for stitching the sides of the buttonhole; but in order to stitch both sides and to tack the ends a lateral displacement of the work-clamp must be effected. For this purpose the slide 4 is mounted on the box between the inner sides of ways E, arranged on the top of the box F and closing the same. The slide is held down on the box by gibs F'. The ways E rest on the top of the box and are free to move laterally on the same and are rigidly connected by suitable screws and blocks 23 with a lower slide 22, mounted to move in a guideway formed in the bottom of the box F, said guideway extending at right angles to the slide 4. The blocks 23 pass through openings in the bottom of the box, which openings are sufficiently long to permit the necessary lateral movement of the slides for crossing the ends of buttonholes. The ways E when moved laterally also carry the slide 4 laterally. The cloth-clamp can therefore be moved laterally in the direction in which the needle moves or vibrates laterally, and also the said cloth-clamp can be moved at right angles to the lateral movement of the said needle, and by properly proportioning the rates of speed of the two slides the clamp can be moved in any desired arc or curve.

To the lower side of the slide 22, Figs. 10 and 11, is pivoted at 25 a bent lever 26, one arm of which carries a block 24, projecting upwardly through a slot in the bottom of the box in position to be engaged by a cam 27, Fig. 12, attached to or forming part of the ratchet-wheel 10. The other arm of the lever 26 extends lengthwise of the slide, and to it is attached a set-screw 28, passing through a slot in said slide, by which means the angular position of the lever may be adjusted. The said lever is provided with a tail 29, adapted to engage a stop 30, secured to the bottom of the box F. A spiral spring 31, attached to the end of the slide 22 and to the box, moves the slide in a direction to cause the block to follow the cam 27. The object of the lever 26 is to afford adjustment in the length of stroke of the slide 22 and to maintain the center line of vibration constant under varying stroke. If the lever is swung about its point of pivoting 25 to move the block 24 away from the cam, the stroke is decreased, and vice versa. To illustrate how the center line of lateral vibration of the slide 22, carrying the slide 4, is maintained, let it be assumed that the lateral stroke of the slide 4 is to be increased. For this purpose the lever 22 is swung about its pivot to cause the block 24 to move toward the cam 27—that is, toward the left of Fig. 10. The tail 29 of said lever therefore turns toward the right of Fig. 10 and away from the stop 30 through the same distance that the block 24 moves to the left or toward the cam. The block 24 being nearer to the cam than before, the throw of the slide 22 toward the right of Fig. 10 is increased and its throw to the left increased a like amount by the tail being moved from the stop through a distance equal to the distance that the block 24 has approached the cam 27. It will be readily understood that if the lever is swung to entirely clear the block 24 from the cam no transverse motion is imparted to the slide 4, and the machine when so set can be used for ordinary tacking.

To prevent the ratchet-wheel 10 from throwing ahead, any suitable friction mechanism may be used. In the present instance, Figs. 9, 13, and 14, I have shown the face of the ratchet-wheel 10 provided with a circular groove, into the bottom of which is fitted a washer, of rubber, leather, or other suitable flexible material. Over said washer $a$ is placed a ring $b$, which is pressed upon by the opposite ends of a yoke-shaped spring-lever $c$, (see Figs. 9 and 23,) the fulcrum of which is formed by screw-studs $d\,d$. The end of said lever is bent downward to form an incline, which is engaged by the head of an adjusting-screw $e$, (see Figs. 5 and 9,) entering the box F, whereby the lever can be turned to cause its pressure upon said ring to be increased or decreased, thereby increasing or decreasing the friction on the ratchet-wheel.

$f$ is an arm attached to the ring $b$ and subjected to the action of a spring $g$, acting in a direction opposite to the direction of rotation of the ratchet-wheel. The function of the pull-back so formed is to always bring the teeth of the ratchet-wheel against the feed-pawl 12 and against the holding-pawl $h$. The two projecting arms of the lever are preferably provided with suitable rollers.

For cutting the buttonhole I make use of a cutter which is depressed at the proper instant by means independent of the stitch-forming mechanism and which is lifted by hand or foot. The cutter-blade 33, Figs. 5, 6, and 7 especially, is secured in a suitable clamp 34, adjustably mounted, to set the cutter, with respect to the opening in the needle-plate 35, in a cam-plate 36, attached to the lower end of the carrier 37. The carrier, which is here shown substantially cylindrical in shape, is guided vertically in suitable bearings formed in the head of the machine and is subjected to the action of a spiral spring 38, the tension of which may be adjusted by turning a tubular screw 39, having an external thread engaging with an internal thread formed in the head of the machine in a usual manner. To the carrier is secured a buffer $n$, of rawhide or other suitable material, to reduce the shock. In the upper end of the carrier is screwed a trip-rod 40, adapted to operate the stop mechanism in a manner hereinafter to be described. The function of the spring 38 is to drive the cutter-blade through the work, and the cutter can be lifted against the action of said spring by a lever 41, pivoted at 41* to the head A of the machine, which lever engages with a roller-stud on an arm 42, rigidly mounted on the cutter-carrier 37 and projecting through an opening in the head of the machine, Figs. 3 and 7. The lever 31 also rests upon a lifter 43, by means of which said lever can be turned upwardly by hand to lift the cutter-carrier. The opposite end of the lever is connected by a rod 44 and chain to one arm of a lever 75, the opposite end of which is attached by a link 76 to the lifter-lever 77, Figs. 18 and 19. Said lever 77 is engaged by the knee-lifter 78. By forcing said knee-lifter to one side the cutter is raised. On the lower end of a downwardly-projecting stud 45* is mounted to turn horizontally a cutter-carrier support 45. A spring 52 (partly shown in Fig. 5) normally turns the support 45 in the direction of the arrow shown in Fig. 25 and the end $a$ under a projection $o'$, formed on the cam-plate 36, when the plate is in its elevated position. A beveled contact-surface $a'$ is formed along the edge of the projection $o'$, and a beveled surface $a^2$ is formed on the end $a$ of the support 45. When the cutter is in its depressed position, the projection $o'$ is below the support 45, and the support, through the action of the spring 52, is turned over the projection $o'$ the distance of the engagement between the same and the support when the latter is holding the former in an elevated position. When the cutter is raised after being depressed, the beveled surfaces $a'$ and $a^2$ come into contact and serve as a means by which the projection $o'$ forces the end $a$ of the support outwardly from the projection until the same has been raised above the support, when the action of the spring on the support turns the same under the projection $o'$, and thereby holds the cutter in an elevated position.

A spindle 48 is mounted vertically in a suitable bearing in the work-carrier box. The said spindle is normally turned, through the action of a spring 48*, (see Fig. 11,) to the left. An arm 49 projects horizontally from the lower end of the spindle 48 (to which it is rigidly attached) across the path of a tappet 50, which is adjustably attached to the under side of the ratchet-wheel 10 and adapted to engage the arm 49 and through it turn the spindle to the right and against the action of the aforementioned spring. An arm 47 extends horizontally from the upper end of the spindle 48. On the outer end of said arm is mounted an eccentric 52*, encircled by one end of a trip-dog carrier 46, the other end of the trip-dog carrier resting on the cutter-carrier support 45, a pin which has a seat in the support extending upwardly through a slot in the carrier serving as a means for guiding the carrier on the support the length of the slot, permitting the longitudinal action of the carrier. A trip-dog 51 is hinged on the under side of the trip-dog carrier, the free end of which rests in a way 51*, formed in the support 45. A projection $a^4$, formed on the trip-dog 51, is adapted to engage an abutment $a^3$, formed on the support 45, and a cam $a^5$, formed on the trip-dog 51, is adapted to engage a cam $a^6$, formed on the outer end of the support 45. The outer end of the trip-dog 51 extends across the path of a cam 36*, formed on the end of the cam-plate 36. The way 51* in the support 45 is formed wide enough to permit of a lateral movement of the trip-dog sufficient to disengage the same from the abutment $a^3$ on the support 45.

The operation of the tripping device is as follows: When the tacking at the finishing end of the buttonhole is about finished, the tappet 50 comes into contact with the arm 49 on the lower end of the spindle 48, and thereby turns the spindle to the right, which in turn pushes the trip-dog carrier 46 forward, causing the projection $a^4$ on the dog 51 to engage the abutment $a^3$ on the support 45, and thereby turn the support on its pivot until the end $a$ of the same is removed from under the projection $o'$ on the cam-plate 36, when the cutter-carrier descends under the action of the spring 38. As the cutter-carrier descends, the cam 36* on the cam-plate 36 pushes the trip-dog 51 laterally on its hinge until the projection $a^4$ on the dog 51 disengages from the abutment $a^3$ on the support 45, when the support, through the action of its spring 52, turns in its normal position, which, as before explained, brings it over the projection $o'$ the distance it is under it when the cutter-carrier is in its elevated position, and, as before explained, when the cutter-carrier is raised to its elevated position the support 45 turns under the projection $o'$, and thereby supports the carrier. It will be understood that after the cutter-carrier has been actuated and raised the tappet 50 is still in engagement with the arm 49 and remains so until the machine is started again, when the action of the ratchet-wheel carries it out of engagement. The trip-dog 51 is in the position shown in Fig. 25 until after the tappet 50 has been turned out of engagement with the arm 49. When the tappet 50 is turned out of engagement with the arm 49, the spindle 48 resumes its normal position, (through the action of its actuating-spring before mentioned,) and through it the trip-dog carrier is returned to its normal or actuating position. As the trip-dog carrier returns to its normal position the cam $a^5$ on the dog engages the cam $a^6$ on the support, which engagement returns the trip-dog to its actuating position again, in which position it is seen in Fig. 8. Any suitable friction can be applied to the trip-dog to prevent undesirable lateral movement of the same. The work-clamp being normally closed, as before stated, I cause the same to be opened simultaneously with the lifting of the cutter by connecting the lever 41 with the upper member of said clamp by means of a screw-rod 90, the nuts 91 of which can be adjusted to determine or limit the distance through which the clamp is to be opened. The lever 41 also carries at its outer end a wedge 71, adapted to enter between the two parts of the tension device 72 for spreading the same apart simultaneously with the opening of the work-clamp in order to loosen the tension on the thread. The lever 41 is subjected to the action of a suitable spiral spring, Fig. 3, to return it to its normal position against a stop 42*.

For the production of a buttonhole in which the line of stitching intersects at the ends thereof, such as illustrated in diagram in Fig. 21, I substitute for the cam 27 (shown in Fig. 12) a cam 27*, provided with notches 80 and 81, properly formed to produce such intersection of the line of stitching. These notches are made substantially V-shaped, and the block 24*, substituted in place of the block 24, (shown in Fig. 10,) is made wedge-shaped to adapt it to follow the outlines of said notches. After the first tack has been completed the cam 27* is in a position to bring the beginning of the notch 80 in line with the block 24* and the needle is at the point $s$ in Fig. 21. On continued rotation of the cam the block follows the first inclined side of said notch and the needle stitches from $s$ to $s'$. As the block is forced outwardly on the second incline of said notch, the needle stitches from $s'$ to $s^2$, and as the block again descends on the third incline the needle stitches from $s^2$ to $s^3$, thus completing the end of the buttonhole. The same action takes place at the opposite end of the buttonhole when the notch 81 reaches the block 24.

To arrest the motion of the machine coincident with the release of the cutter, the trip-arm 40, arranged on the cutter-bar, as previously described, engages with a lever 55, which turns about the segment-shaft 1 as a fulcrum, Figs. 2 and 3. Said lever is connected by a link 56 with a second lever 57, having its free end extending across a notched latch 58 at the rear of the machine and seated in a notch formed therein, Fig. 4. Said latch 58 is connected with the operating-lever 62 of the friction-clutch.

In the present instance I have shown the stop mechanism to consist of a friction-clutch provided with a suitable brake for arresting the motion of the main shaft when the clutch is opened. The clutch is here shown as composed of a conical wheel 60, rigidly mounted on the main shaft, and a second wheel 66, entering the first wheel and running loosely on said main shaft, said latter wheel being provided with the driving-pulley $p$. The clutch-lever 62 is subjected to the action of a spiral spring 63, the tension of which can be adjusted by an adjusting-screw 64. The wheel 60 is encompassed by a brake-strap 61, having one end attached to a stud $t$, secured to the head of the machine, and its other end adjustably connected to the hub of the clutch-lever 62. The end of the clutch-lever is inclined and adapted to engage with the reduced and rounded end of the wheel 66. The bearing between the said wheel and lever may be formed by an inserted block of hard wood. In Fig. 4 I have shown the clutch closed. When the slide 58 is released from the lever 57, the clutch-lever is drawn forward by the spring 63, and the projecting incline thereon is moved away from the wheel 66 and the clutch opens. This motion of the clutch-lever at the same time draws the brake-strap against the wheel 60 and instantaneously arrests the motion thereof. To hold the brake-strap normally out of contact with the wheel 60, a suitable spring suspension device, such as $w$, Fig. 4, attached to the upper portion of the brake-strap, is used.

For closing the clutch to start the machine a projecting arm on the lever 62 is connected by a link or rod 70 with the lever 77, Figs. 18, 19, and 20.

While in the present instance I have shown a foot-power machine, it is of course to be understood that a similar system of levers could be applied to a power-machine; but in this case the last step would be the coupling of the friction-clutch to start the machine.

It will be readily understood that when the knee-lever or lifter is shifted by the foot or knee of the operator the work-clamp is opened, the tension is released, the cutter raised, and the clutch thrown in, so that the machine is ready to start another buttonhole by one movement, said parts all returning to their normal positions on the release of said knee-lever or lifter.

What I claim as new is—

1. The combination with a buttonhole-sewing machine having a work-carrier and mechanism for actuating the latter, embodying a feed-wheel, a friction device having a movable friction member in contact with said feed-wheel, and means connected with said movable member for applying a force to the same in a direction opposite to the direction of rotation of the feed-wheel, substantially as described.

2. In a sewing-machine having a vertically-reciprocating and laterally-vibrating needle, the combination of a slide mounted to reciprocate toward and from the needle, a cam engaging said slide for reciprocating the same, a second cam for moving the slide transversely to aforesaid movement, a work-clamp attached to said first slide and bifurcated at its outer end, a cloth-plate forming part of said clamp and provided with an elongated opening or slot and with beveled sides sloping toward said elongated opening or slot, and presser-shoes attached to the bifurcated end of the clamp and adapted to engage with the work and to turn laterally toward the opening or slot, as the clamp is closed, substantially as described.

3. In a sewing-machine having a vertically-reciprocating and laterally-vibrating needle, the combination of a work-clamp, a slide mounted to reciprocate toward and from the needle and carrying the work-clamp, a ratchet-wheel, an adjustable cam operated by said ratchet-wheel and placed in operative connection with said slide for reciprocating it longitudinally, a second cam operated by said ratchet-wheel, a second slide operated by said second cam, an adjustable block on said second slide, a spring for holding said block against said second cam to reciprocate said second slide transversely to the first slide, a connection between the two slides, and means for operating the ratchet-wheel, substantially as described.

4. In a sewing-machine having a vertically-reciprocating and laterally-vibrating needle, the combination of a work-clamp, a slide mounted to reciprocate toward and from the needle and carrying the work-clamp, a ratchet-wheel, a cam operated by said ratchet-wheel and placed in operative connection with said slide for reciprocating it longitudinally, a second cam operated by said ratchet-wheel, a second slide operated by said second cam, a lever mounted on said slide, a block on said lever adapted to engage with the second cam, a spring adapted to hold the block against the cam, means for adjusting said lever on its fulcrum, and a stop engaged by said lever, substantially as described.

5. In a sewing-machine having a vertically-reciprocating and laterally-vibrating needle, the combination of a work-clamp, a slide mounted to reciprocate toward and from the needle and carrying the work-clamp, a ratchet-wheel, a cam operated by said ratchet-wheel and placed in operative connection with said slide for reciprocating it longitudinally, a second cam provided with notches and operated by said ratchet-wheel, a second slide operated by said second cam, a lever mounted on said slide, a block with converging sides on said lever adapted to engage with the second cam, a spring adapted to hold the block against the cam, means for adjusting said lever on its fulcrum, and a stop engaged by said lever, substantially as described.

6. In a sewing-machine having a vertically-reciprocating and laterally-vibrating needle, the combination of a slide mounted to reciprocate toward and from the needle, a work-clamp attached thereto, a ratchet-wheel, a cam operated by said ratchet-wheel and placed in operative connection with said slide for reciprocating it longitudinally, cross-slides on each side of aforesaid slide, a second cam mounted on the ratchet-wheel, a transverse slide, a lever pivoted to said slide and provided with a block adapted to engage with said second cam, means for adjusting said lever on its fulcrum, a spring acting on said slide, and connections between the cross-slides and the transverse slide, substantially as described.

7. In a buttonhole-sewing machine having a vertically-reciprocating and laterally-vibrating needle, the combination of a work-clamp, means for reciprocating the said work-clamp in a direction at right angles to the lateral vibrations of the said needle, a cutter, means for depressing said cutter to slit the buttonhole, and means for lifting the cutter and opening the work-clamp simultaneously, substantially as described.

8. In a sewing-machine, the combination of a stitch-forming mechanism, a work-clamp normally held closed, a cutter, means for depressing said cutter, a tension device for the thread, a lever, an adjustable connection between said lever and work-clamp, a projection on said lever adapted to engage the tension device for opening the latter when the cutter is raised, a foot-lever, and a connection between said foot-lever and the lifting-lever for operating the former, substantially as described.

9. The combination with a buttonhole-sewing machine having a work-carrier and mechanism for actuating the latter, embodying a feed-wheel, a friction device having a movable friction member in contact with said feed-wheel, means connected with said movable member for applying a force to the same in a direction opposite to the direction of rotation of the feed-wheel, and a stop engaging with the feed-wheel, substantially as described.

10. In a sewing-machine, the combination of a stitch-forming mechanism, a work-carrier, a ratchet-wheel provided with a circular groove on one side having a lined bottom, a friction-ring fitting in said groove, an arm on said ring, a spring attached to said arm and straining the same in a direction opposed to the feed of the ratchet-wheel, a holding-pawl, a spring-lever provided with two arms having roller-studs and engaging with the friction-ring on opposite sides of its center, a sloping projection formed on said spring-lever, and an adjusting-screw adapted to engage said projection to turn the lever on its fulcrum for increasing or decreasing the pressure on the friction-ring, substantially as described.

11. In a sewing-machine having a vertically-reciprocating and laterally-vibrating needle, the combination of a work-carrier, a cam for operating said work-carrier, a ratchet-wheel for operating said cam and provided with a circular groove on one side having a lined bottom, a friction-ring fitting in said groove, an arm on said ring, a spring attached to said arm and straining the same in a direction opposed to the feed of the ratchet-wheel, a holding-pawl, a spring-lever provided with two arms having roller-studs and engaging with the friction-ring on opposite sides of its center, and an adjusting-screw engaging said lever, substantially as described.

12. In a sewing-machine having a reciprocating needle, the combination of a work-carrier located back of the needle, a cam for moving said work-carrier longitudinally, a cam for moving it transversely, a ratchet-wheel on which said cams are mounted, a feed-pawl, a slide to which said feed-pawl is attached, a vibratory segment, an adjustable connection between the same and the slide, a shaft upon which said segment is mounted, and an eccentric connection between said shaft and the main shaft of the machine constructed to operate said segment-shaft at each turn of said main shaft, substantially as described.

13. In a sewing-machine having a vertically-reciprocating and laterally-vibrating needle, the combination of a shaft mounted transversely to the main shaft, mechanism intermediate the main shaft and the said transverse shaft whereby the latter is oscillated, a needle-bar gate or frame actuating segment mounted on said transverse shaft, and operative connection between said segment and the needle-bar gate or frame, a second segment rigidly mounted on said latter shaft, a work-carrier mechanism, and a connection between the second segment and the feed-wheel of said mechanism, substantially as described.

14. In a sewing-machine, the combination of a work-carrier mechanism for moving said work-carrier longitudinally and transversely, a buttonhole-cutter, a spring for depressing the same to slit the work, a movable support for holding said cutter in its elevated position, means for automatically removing the support to trip the cutter, a lever engaging with the cutter to lift the same, a connection between said lever and the work-carrier clamp and the tension device for opening the clamp and releasing the tension, and a spring for closing the work-clamp, substantially as described.

15. In a buttonhole-sewing machine, the combination of a stitch-forming mechanism, a work-carrier, slides arranged to move transversely to each other and to one of which the work-clamp is connected, a cam provided with concentric surfaces and with notches forming inclined surfaces, means for turning said cam, and a wedge-shaped block connected with one of the slides and engaging said cam, and means for imparting longitudinal motion to the other slide; all adapted to form intersecting lines of stitches at the ends of the buttonholes, substantially as described.

16. In a sewing-machine, the combination of a buttonhole-work carrier, a buttonhole-cutter, a spring engaging said cutter for depressing said cutter automatically, a stop for automatically arresting the motion of the machine, and a lever connection between said stop and the cutter for operating the former to arrest the motion of the machine when the cutter is depressed, substantially as described.

17. In a sewing-machine, the combination of a work-carrier, a buttonhole-cutter, means for depressing and elevating the cutter, a wheel affixed to the main shaft of the machine, a second wheel loosely mounted on the same shaft and adapted to engage with the first wheel, a clutch-lever, a strap encircling the first wheel and having one end attached to a fixed stud and the other end attached to the clutch-lever, an incline on the clutch-lever adapted to engage with the second wheel, a lever adapted to be engaged by the cutter, and a connection between said lever and the clutch-lever, substantially as described.

18. In a sewing-machine having a vertically-reciprocating and laterally-vibrating needle, the combination of a buttonhole-work carrier, a buttonhole-cutter, a wheel mounted on the main shaft of the machine, a second wheel loosely mounted on said shaft and adapted to engage with the first wheel, a clutch-lever, a strap having one end attached to a fixed stud and the other end to the clutch-lever and encompassing the first wheel, a spring acting on the lever to close the strap about the said wheel, a latch in connection with the clutch-lever, a lever engaging with said latch for holding said lever in its operative position, a connection between the cutter and said latch for releasing the clutch-lever on the depression of the cutter, and means for vibrating the lever to couple the wheels, substantially as described.

19. In a sewing-machine having a vertically-reciprocating and laterally-vibrating needle, the combination of a buttonhole-work carrier, a buttonhole-cutter, a spring for depressing said cutter, a movable support for holding said cutter in an elevated position, means for removing said support to permit the depression of the cutter by the spring, a spring for returning the support in position to support the cutter, a lever engaging with the cutter, means for lifting said lever by hand to raise the cutter, and a connection between said lever and the work-clamp for opening the latter when said lever is lifted, substantially as described.

20. In a buttonhole-sewing machine, the combination of a work-clamp mounted to move longitudinally, a cutter, means for depressing said cutter to make the buttonhole, a lever for lifting said cutter after its depression, and a connection between said lever and the work-clamp for opening the clamp when the cutter is lifted, substantially as described.

21. The combination in a buttonhole-sewing machine, of a cutter, a work-clamp, means for operating the cutter and opening the work-clamp, a tension device, and means for opening the tension device when the clamp is opened and for maintaining the same open after the clamp is closed, substantially as described.

22. The combination in a buttonhole-sewing machine, of a cutter, a work-clamp, means for operating the cutter and opening the work-clamp, a tension device, and means for opening the tension device when the clamp is opened and for maintaining the same open after the clamp is closed and for causing the tension to be closed when the needle descends, substantially as described.

In testimony that I claim the foregoing as my invention I have signed my name, in presence of two witnesses, this 27th day of October, 1896.

W. N. PARKES.

Witnesses:
EUGENIE A. PERSIDES,
A. FABER DU FAUR, Jr.